United States Patent
Muranaka

(10) Patent No.: US 10,661,989 B2
(45) Date of Patent: May 26, 2020

(54) AUTOMATED EQUIPMENT SYSTEM, EMERGENCY STOP TERMINAL, AND OPERATION TERMINAL CONTROL METHOD

(71) Applicant: MURATA MACHINERY, LTD., Kyoto-shi, Kyoto (JP)

(72) Inventor: Takeshi Muranaka, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 348 days.

(21) Appl. No.: 15/571,523

(22) PCT Filed: Apr. 8, 2016

(86) PCT No.: PCT/JP2016/061612
§ 371 (c)(1),
(2) Date: Nov. 3, 2017

(87) PCT Pub. No.: WO2016/181734
PCT Pub. Date: Nov. 17, 2016

(65) Prior Publication Data
US 2018/0141751 A1 May 24, 2018

(30) Foreign Application Priority Data
May 11, 2015 (JP) ................................. 2015-096934

(51) Int. Cl.
*G05B 11/01* (2006.01)
*B65G 1/04* (2006.01)
(Continued)

(52) U.S. Cl.
CPC ............ *B65G 1/0421* (2013.01); *B25J 13/06* (2013.01); *B25J 19/06* (2013.01); *G05D 1/0016* (2013.01);
(Continued)

(58) Field of Classification Search
CPC .... B65G 1/0421; B65G 2207/40; B25J 13/06; B25J 19/06; G05D 1/0016; G05D 1/0066;
(Continued)

(56) References Cited

U.S. PATENT DOCUMENTS

| 8,344,848 B2* | 1/2013 | Moschl ............. G05B 19/4184 318/568.11 |
| 8,970,363 B2* | 3/2015 | Kraimer ............. B60R 21/0132 340/539.1 |

(Continued)

FOREIGN PATENT DOCUMENTS

| JP | 2002-293412 A | 10/2002 |
| JP | 2003-212333 A | 7/2003 |

(Continued)

OTHER PUBLICATIONS

English translation of Official Communication issued in International Patent Application No. PCT/JP2016/061612, dated Nov. 23, 2017.

(Continued)

*Primary Examiner* — Zhen Y Wu
(74) *Attorney, Agent, or Firm* — Keating & Bennett, LLP

(57) ABSTRACT

An automated equipment system including a stacker crane includes an emergency stop terminal and a controller that executes operational control of the stacker crane. The emergency stop terminal includes an emergency stop button; and a first communicator that performs wireless communication with the controller, and changes a state of the wireless communication with the controller when the emergency stop button is operated. The controller: executes the operational control of the stacker crane according to a command from an operation terminal, when wireless communication with both the emergency stop terminal and the operation terminal, which transmits a command for the operational control of the stacker crane, is possible; and stops operation of the (Continued)

stacker crane when the state of the wireless communication with the first communicator is changed.

7 Claims, 8 Drawing Sheets

(51) Int. Cl.
    *B25J 19/06*     (2006.01)
    *B25J 13/06*     (2006.01)
    *G05D 1/00*     (2006.01)
    *G05D 1/02*     (2020.01)

(52) U.S. Cl.
    CPC ......... *G05D 1/0066* (2013.01); *G05D 1/0223* (2013.01); *B65G 2207/40* (2013.01); *G05D 1/0033* (2013.01); *G05D 1/0276* (2013.01); *G05D 2201/0216* (2013.01)

(58) Field of Classification Search
    CPC .. G05D 1/0223; G05D 1/0033; G05D 1/0276; G05D 2201/0216
    USPC ...................................... 340/12.22
    See application file for complete search history.

(56) References Cited

U.S. PATENT DOCUMENTS

| | | | |
|---|---|---|---|
| 9,082,293 B2* | 7/2015 | Wellman | G08C 17/02 |
| 2008/0052800 A1* | 3/2008 | Nair | A45F 5/00 |
| | | | 2/22 |
| 2009/0030550 A1* | 1/2009 | Nagata | B25J 19/06 |
| | | | 700/251 |
| 2009/0033457 A1* | 2/2009 | Griessnig | G05B 19/409 |
| | | | 340/5.5 |
| 2010/0106299 A1* | 4/2010 | Nagata | B25J 13/06 |
| | | | 700/264 |
| 2011/0010006 A1 | 1/2011 | Tani et al. | |
| 2011/0196527 A1* | 8/2011 | De Lille | B23D 59/008 |
| | | | 700/103 |
| 2013/0172153 A1* | 7/2013 | Watterson | A63B 21/015 |
| | | | 482/5 |
| 2013/0310951 A1* | 11/2013 | Fisher | A63J 99/00 |
| | | | 700/2 |
| 2014/0277613 A1* | 9/2014 | Love | A63J 1/02 |
| | | | 700/83 |
| 2014/0343758 A1* | 11/2014 | Kraimer | G05D 1/0016 |
| | | | 701/2 |
| 2015/0045911 A1* | 2/2015 | Sakamoto | G05B 19/0428 |
| | | | 700/11 |
| 2015/0142714 A1* | 5/2015 | Golota | H04W 84/18 |
| | | | 706/23 |
| 2015/0331398 A1* | 11/2015 | Love | G05B 15/02 |
| | | | 700/275 |
| 2016/0016096 A1* | 1/2016 | Fisher | G05B 19/0421 |
| | | | 700/90 |
| 2016/0216704 A1* | 7/2016 | Koh | G06F 11/1675 |
| 2016/0251206 A1* | 9/2016 | Gold | B65B 57/02 |
| | | | 53/492 |
| 2018/0141751 A1* | 5/2018 | Muranaka | B25J 13/06 |

FOREIGN PATENT DOCUMENTS

| | | |
|---|---|---|
| JP | 2007-107305 A | 4/2007 |
| JP | 4353426 B2 | 10/2009 |
| JP | 2009-260773 A | 11/2009 |
| JP | 2011-000652 A | 1/2011 |
| JP | 2013-030641 A | 2/2013 |
| WO | 2009/119379 A1 | 10/2009 |

OTHER PUBLICATIONS

Official Communication issued in International Patent Application No. PCT/JP2016/061612, dated Jul. 5, 2016.

* cited by examiner

AUTOMATED EQUIPMENT SYSTEM, EMERGENCY STOP TERMINAL, AND OPERATION TERMINAL CONTROL METHOD

BACKGROUND OF THE INVENTION

1. Field of the Invention

The present invention relates to an automated equipment system including automated equipment, a controller that executes operational control of the automated equipment, and an emergency stop terminal that causes the automated equipment to make an emergency stop.

2. Description of the Related Art

Conventionally, there are automated equipment systems that include automated equipment such as a transport carriage for unmanned transportation of cargo. In such an automated equipment system, an operator can execute remote control of the automated equipment via wireless communication by performing input operations on a portable operation terminal, for example.

For example, Japanese Unexamined Patent Application Publication No. 2009-260773 discloses a communication system that controls equipment such as a transport carriage, using a remote control. In this communication system, communication is carried out between the remote control and equipment, using both infrared and wireless communication. The frequency for wireless communication is specified by infrared communication from the remote control to the equipment, and a reply is made from the equipment to the remote control by wireless communication in the specified frequency.

According to the above-described configuration, since infrared rays have directivity, addressing of unintended equipment from the remote control does not occur. Furthermore, since the equipment replies to the remote control using wireless communication in the specified frequency, the possibility of wireless communication interference can be reduced.

SUMMARY OF THE INVENTION

The operating area of automated equipment such as a transport carriage and the surrounding area are separated from the usual work area of a person (operator) by, for example, an intrusion prevention fence which restricts the entrance of people.

Furthermore, when a general purpose portable terminal device that is available on the market, for example, is used as the operation terminal that operates the automated equipment via wireless communication, it is difficult or substantially impossible to provide the operation terminal with a function (emergency stop function) that causes the automated equipment to make an emergency stop. Here, the emergency stop function is a function that satisfies a predetermined safety standard. As such, input operation from the wireless operation terminal carried by the operator is restricted to only the case where the operator (i.e., the operation terminal) is located outside the intrusion prevention fence. Furthermore, when the operator goes inside the intrusion prevention fence for automated equipment maintenance, etc., the operator needs to operate the automated equipment by using a wired remote control equipped with an emergency stop button.

Specifically, it is necessary for the operator to switch from a wireless and portable operation terminal to an operation terminal connected by a communication cable to the control device that controls the automated equipment, to perform the maintenance work, etc. This is not desirable from the point of view of efficiency of maintenance work, etc.

In view of the problems described above, preferred embodiments of the present invention provide automated equipment systems, etc., that are safe and have excellent workability.

An automated equipment system according to an aspect of a preferred embodiment of the present invention is an automated equipment system including automated equipment, the automated equipment system including: an emergency stop terminal that causes the automated equipment to make an emergency stop; and a controller that is configured or programmed to executes operational control of the automated equipment, wherein the emergency stop terminal includes: an emergency stop button; and a first communicator that performs wireless communication with the controller, and changes a state of the wireless communication with the controller when the emergency stop button is operated, and the controller is configured or programmed to: (a) execute the operational control of the automated equipment according to a command from an operation terminal, when wireless communication with both the operation terminal and the emergency stop terminal is possible, the operation terminal being a terminal that transmits a command for the operational control of the automated equipment; and (b) stop operation of the automated equipment when the state of the wireless communication with the first communicator is changed.

According to this configuration, when the pair of the operation terminal and the emergency stop terminal are able to perform wireless communication with the controller, the controller is configured or programmed to execute operational control of the automated equipment according to a command from the operation terminal (i.e., equipment operation from the operation terminal).

In this manner, even when the controller operates to enable remote control of the automated equipment using the operation terminal, the operator is able to cause an emergency stop of the automated equipment by remote control using the emergency stop terminal, and thus a certain level of safety is ensured.

Furthermore, since both the operation terminal and the emergency stop terminal perform wireless communication with the controller, the automated equipment maintenance work, etc., performed by the operator is not hindered by communication cables, for example.

In this manner, the automated equipment system according to this aspect is an automated equipment system that is safe and has excellent workability.

Furthermore, in an automated equipment system according to an aspect of a preferred embodiment of the present invention, the controller may be configured or programmed to: execute the operational control of the automated equipment according to the command from the operation terminal when the controller receives the command from the operation terminal in a period in which the wireless communication with the first communicator is being continuously performed; and stop the operation of the automated equipment when the wireless communication with the first communicator stops.

According to this configuration, when the operator is operating the automated equipment using the operation terminal, the wireless communication between the emergency stop terminal and the controller is performed continuously while such operation is being performed. As such, an emergency stop of the automated equipment using the emergency stop terminal becomes more reliable, and the safety of the equipment operation from the operation terminal further improves.

Furthermore, in an automated equipment system according to an aspect of a preferred embodiment of the present invention, the emergency stop terminal may further include a second communicator that performs, with the operation terminal, enabling communication including at least one of transmitting and receiving predetermined information, to enable the operational control of the automated equipment, and the controller may be configured or programmed to execute the operational control of the automated equipment according to the command from the operation terminal, when the controller receives a signal transmitted by at least one of the operation terminal and the emergency stop terminal after the enabling communication is performed.

According to this configuration, communication that is in accordance with a predetermined rule is performed between the operation terminal and the emergency stop terminal, and thus a signal is transmitted to the controller from at least one of the operation terminal and the emergency stop terminal. As a result, the controller executes the operational control of the automated equipment according to a command from the operation terminal.

Specifically, for example, when wireless communication with only one of the operation terminal and the emergency stop terminal is established, receiving a signal from the other enables the controller to confirm that both the operation terminal and the emergency stop terminal are in a state where wireless communication with the controller is possible. As a result, the controller operates to execute the operational control of the automated equipment according to a command from the operation terminal. Stated differently, the establishment of the enabling communication is used as proof that the pair of the operation terminal and the emergency stop terminal are in an active state, and, as a result, the controller operates to enable the equipment operation from the operation terminal.

For example, even when the equipment operation from the operation terminal is temporarily prohibited due to the operator carrying the operation terminal being present relatively near the automated equipment, equipment operation from the operation terminal becomes possible by performing enabling communication. Even in this case, the operator can cause the automated equipment to make an emergency stop, by using the emergency stop terminal, and thus a certain level of safety is ensured.

Furthermore, in an automated equipment system according to an aspect of a preferred embodiment of the present invention, the first communicator may transmit, to the controller, a signal including information regarding the operation terminal which is the predetermined information, after the second communicator performs the enabling communication with the operation terminal, and the controller may be configured or programmed to execute the operational control of the automated equipment according to the command from the operation terminal, under at least one condition that the controller receives the signal including the information regarding the operation terminal transmitted from the emergency stop terminal.

According to this configuration, the controller is able to obtain the information regarding the operation terminal, via the emergency stop terminal. As such, the controller, for example, is able to accurately recognize the presence of the pair of the operation terminal and the emergency stop terminal. In other words, the controller is able to perform authentication of the operation terminal based only on information transmitted from the emergency stop terminal out of the operation terminal and the emergency stop terminal.

Furthermore, in an automated equipment system according to an aspect of a preferred embodiment of the present invention, in the enabling communication, the second communicator may receive, from the operation terminal, first identification information which is identification information of the operation terminal and is the predetermined information, and the first communicator may transmit, to the controller, a signal including the first identification information which is the information regarding the operation terminal.

According to this configuration, the controller is able to obtain identification information of the operation terminal, via the emergency stop terminal. As such, for example, when the controller subsequently receives a command for the operational control of the automated equipment, the controller more reliably or more speedily determines the propriety of the terminal that transmitted the command.

Furthermore, in an automated equipment system according to an aspect of a preferred embodiment of the present invention, the controller may execute the operational control of the automated equipment according to the command from the operation terminal, under at least one condition that the controller receives a signal including information regarding the emergency stop terminal transmitted from the operation terminal.

According to this configuration, the controller is able to obtain information regarding the emergency stop terminal, via the operation terminal. As such, the controller, for example, is able to accurately recognize the presence of the pair of the operation terminal and the emergency stop terminal. In other words, the controller is able to recognize that the operation terminal is a terminal that is used in combination with an emergency stop terminal having the appropriate emergency stop function. In other words, the controller is able to authenticate the operation terminal based on only the information from the operation terminal out of the operation terminal and the emergency stop terminal.

Furthermore, in an automated equipment system according to an aspect of a preferred embodiment of the present invention, in the enabling communication, the second communicator may transmit, to the operation terminal, second identification information which is identification information of the emergency step terminal, and the controller may execute the operational control of the automated equipment according to the command from the operation terminal, under at least one condition that the controller receives a signal including the second identification information which is the information regarding the emergency stop terminal transmitted from the operation terminal.

According to this configuration, the controller is able to obtain identification information of the emergency stop terminal, via the operation terminal. As such, the controller is able to more reliably or more speedily authenticate the operation terminal.

Furthermore, in an automated equipment system according to an aspect of a preferred embodiment of the present invention, the emergency stop terminal may further include a wear pad that enables removably wearing of the emergency stop terminal at a position on a human body.

According to this configuration, for example, the operator can easily wear the emergency stop terminal at a position that facilitates pressing of the emergency stop button or a position that does not hinder maintenance work, etc., such as on an arm or a wrist. This contributes to the improvement of safety or workability of the automated equipment system.

Furthermore, an emergency stop terminal according to an aspect of a preferred embodiment of the present invention is an emergency stop terminal that causes automated equipment, operational control of which is executed by a controller, to make an emergency stop, wherein the controller executes the operational control of the automated equipment according to a command transmitted from an operation terminal via wireless communication, the emergency stop terminal including an emergency stop button; a first communicator that performs wireless communication with the controller, and changes a state of the wireless communication with the controller when the emergency stop button is operated; and a second communicator that performs, with the operation terminal, enabling communication including at least one of transmitting and receiving predetermined information, to enable the operational control of the automated equipment according to a command from the operation terminal.

According to this configuration, the emergency stop terminal is able to perform, with the operation terminal, enabling communication to enable equipment operation from the operation terminal. Furthermore, when the controller operates to allow the equipment operation from the operation terminal as a result of the performance of enabling communication, the operator is able to cause the automated equipment to make an emergency stop, by using the emergency stop terminal. In other words, with the emergency stop terminal, operation of the automated equipment via the wireless communication from the operation terminal and emergency stopping of the automated equipment during an emergency are both able to be achieved.

Furthermore, an operation terminal control method according to an aspect of a preferred embodiment of the present invention is an operation terminal control method executed by an operation terminal which, by transmitting, via wireless communication, a command to a controller that executes operational control of automated equipment, causes the controller to execute operational control of the automated equipment according to the command, the operation terminal control method including performing enabling communication with an emergency stop terminal that performs wireless communication with the automated equipment and that causes the automated equipment to make an emergency stop, the enabling communication being communication including at least one of transmitting and receiving predetermined information, to enable the operational control of the automated equipment.

According to this control method, it is possible to cause the controller to perform, with the emergency stop terminal, enabling communication which includes at least one of transmitting and receiving predetermined information. Specifically, since the operation terminal and the emergency stop terminal become a pair and perform communication according to a predetermined rule, the controller, for example, is able to be made to recognize the presence of the pair of the operation terminal and the emergency stop terminal.

Furthermore, an operation terminal control method according to an aspect of a preferred embodiment of the present invention may further include transmitting a signal including information regarding the emergency stop terminal which is the predetermined information, to the controller, after the performing of the enabling communication.

According to this control method, information regarding the emergency stop terminal is supplied from the operation terminal to the controller. As a result, the controller, for example, is able to accurately recognize the presence of the pair of the operation terminal and the emergency stop terminal.

Furthermore, in an operation terminal control method according to an aspect of a preferred embodiment of the present invention, the performing of the enabling communication may include receiving identification information of the emergency stop terminal which is the predetermined information, and in the transmitting of the signal, the signal including the identification information received in the receiving of the identification information may be transmitted to the controller, the identification information being the information regarding the emergency stop terminal.

According to this control method, the controller is able to obtain identification information of the emergency stop terminal, via the operation terminal. As such, the controller is able to more reliably or more speedily authenticate the operation terminal.

It should be noted that various preferred embodiments of the present invention can be realized as a program that causes a computer to execute one or more steps included in the operation terminal control method and as a computer-readable recording medium, such as a CD-ROM, on which the program is recorded. Furthermore, the program may be distributed via a communication network such as the internet.

According to preferred embodiments of the present invention, it is possible to provide automated equipment systems, etc., that are safe and have excellent workability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, automated equipment systems according to preferred embodiments of the present invention will be described with reference to the drawings. It should be noted that the respective figures are schematic diagrams and are not necessarily precise illustrations.

Furthermore, the preferred embodiments described below are generic or specific examples. The numerical values, shapes, materials, structural components, the arrangement and connection of the structural components, etc., shown in the following preferred embodiments are mere examples, and are not intended to limit the present invention. Furthermore, among the structural components in the following preferred embodiments, structural components not recited in any one of the independent claims defining the most generic concepts are described as arbitrary structural components.

Figure 2:
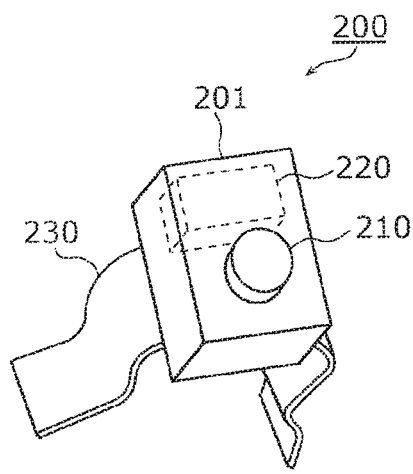
FIG. 2 is a perspective view of an outline configuration of an emergency stop terminal according to a preferred embodiment of the present invention.
Figure 3:
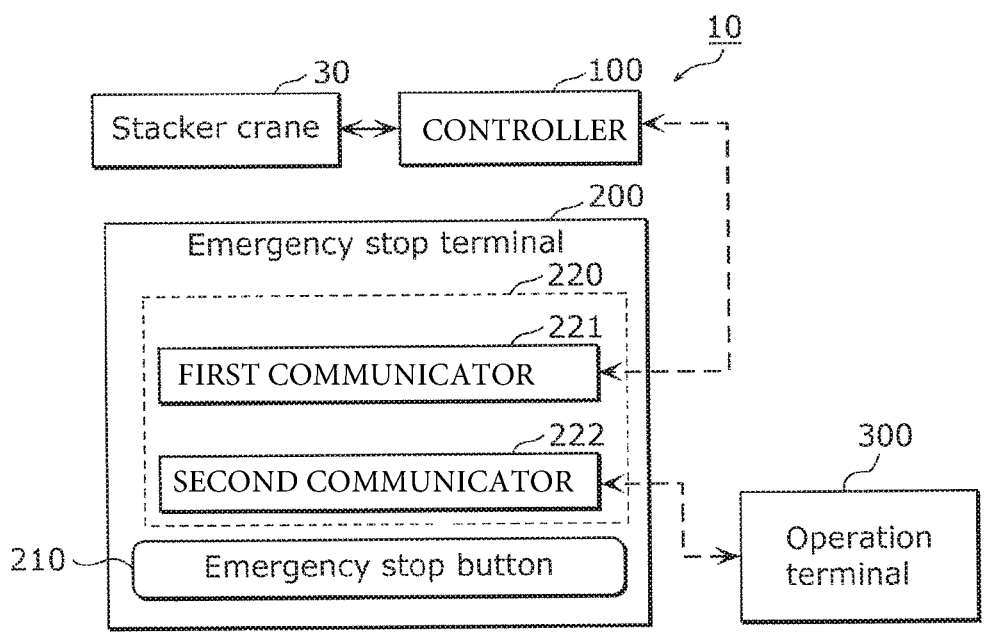
FIG. 3 is a block diagram illustrating an outline configuration of an automated equipment system according to a preferred embodiment of the present invention.

First, the outline configuration of an automated equipment system 10 according to a preferred embodiment of the present invention will be described using FIG. 1 to FIG. 3.

Figure 1:
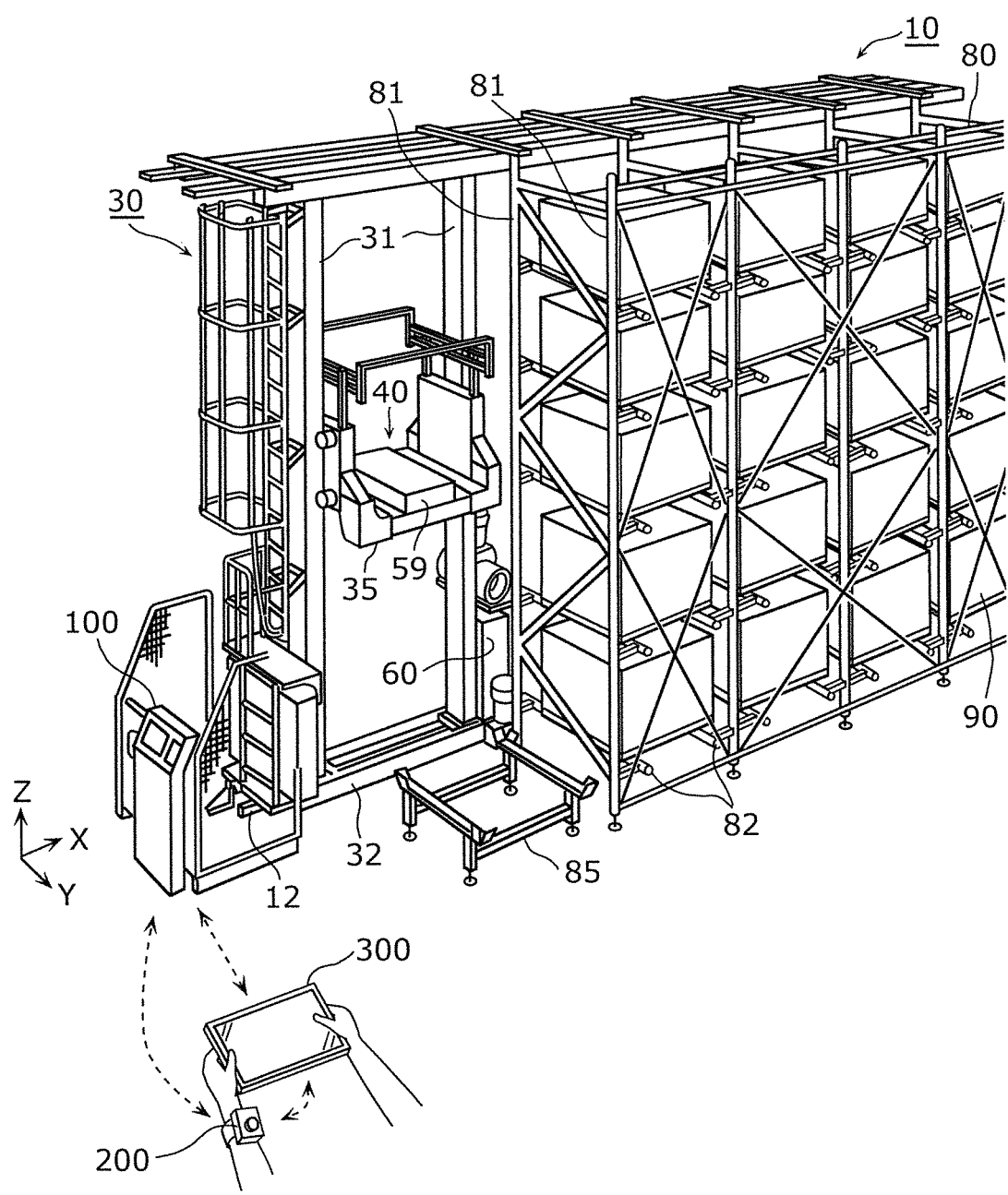
FIG. 1 is a perspective view of an outline configuration of an automated equipment system according to a preferred embodiment of the present invention.

FIG. 1 is a perspective view of the outline configuration of the automated equipment system 10 according to the present preferred embodiment. FIG. 2 is a perspective view of the outline configuration of an emergency stop terminal 200 according to the present preferred embodiment. FIG. 3 is a block diagram illustrating the outline configuration of the automated equipment system 10 according to the present preferred embodiment.

As illustrated in FIG. 1, the automated equipment system 10 according to this preferred embodiment includes a stacker crane 30, a controller 100 which executes operational control of the stacker crane 30, and an emergency stop terminal 200 that causes the stacker crane 30 to make an emergency stop.

The stacker crane 30 is an example of automated equipment, and is equipment that transports a cargo 90 and transfers the cargo 90 to and from a rack 80 according to control signals transmitted from the controller 100.

In this preferred embodiment, the stacker crane 30 includes a bottom carriage 32 and a top carriage (not illustrated in the figures), two masts 31 which connect the bottom carriage 32 and the top carriage, and a lift stage 35 that moves up and down along the two masts 31.

The bottom carriage 32 is, for example, a carriage that travels along a bottom rail 12 provided on the floor surface, and the top carriage is, for example, a carriage that runs along a top rail (not illustrated in the figures) provided on the ceiling surface. The bottom carriage 32 moves synchronously with the top carriage, and thus the two masts 31 are kept in an orientation that is parallel or substantially parallel to the vertical direction.

A transfer device 40 that transfer the cargo 90 is provided in the lift stage 35. The transfer device 40 according to this preferred embodiment is a device that transfers the cargo 90 using a slide fork 59. The slide fork extends and retracts (expands and contracts) in the direction of the rack 80 by way of a telescopic structure including a top plate, a middle plate, and a base plate, for example. It should be noted that there is no particular limitation to the method that transfer the cargo 90 that the transfer device 40 executes, and a SCARA arm method or a push-pull method may be utilized as the transferring method.

The lift stage 35 is suspended using wire rope, and moves up and down according to the rotation of a lifting motor included in a lift drive device 60, while being guided by the two masts 31.

The stacker crane 30 travels along a track (the bottom rail 12 and the top rail), causes the lift stage 35 to move up and down, and causes the slide fork 59 of transfer device 40 to extend and retract. Through such operations, the stacker crane 30 transports the cargo 90 and deliver (transfer) the cargo 90 between the rack 80 and a station 85, etc.

It should be noted that the station 85 is a temporary placement area for the cargo 90. For example, a cargo 90 housed in the rack 80 is taken out from the rack 80 and transported by the stacker crane 30, and is subsequently taken to a predetermined place after being temporarily placed on the station 85.

The rack 80 is a structure including a plurality of support columns 81, and includes a plurality of shelves 82 each including a pair of support components. Each of the pair of support components is installed bridging across two support columns 81 in the front and rear.

The cargo 90 that is transported by the stacker crane is placed inside the rack 80 from the front side of the rack 80. Furthermore, the cargo 90 housed inside rack 80 is taken out from the front side of rack 80 by stacker crane 30. More specifically, the slide fork 59 of the transfer device 40 passes, in the upward-downward direction, between the pair of support components included in a shelf 82, to execute the lifting of the cargo 90 for the placement of the cargo 90 on the shelf 82 or the retrieval of the cargo 90 placed on the shelf 82.

The controller 100 is a device that executes operational control of the stacker crane 30. In this preferred embodiment, the controller 100 executes the operational control of the stacker crane 30 according to a command transmitted from the operation terminal 300 via wireless communication, under a predetermined condition. The controller 100 further causes the operation of the stacker crane 30 to stop when wireless communication with the emergency stop terminal 200 stops.

Specifically, for example, the controller 100 is able to execute the normal operational control of the stacker crane 30 to transport the cargo 90, etc., according to a command transmitted from a management device which is a master computer in the automated equipment system 10. The controller 100 is able to execute the operational control of the stacker crane 30 based on a command from an operation terminal 300. It should be noted that the various information processing performed by the controller 100 are implemented through the execution of a predetermined program by a computer including a central processing unit (CPU), a storage device such as a memory, and an interface for input/output of information, etc.

In this preferred embodiment, the operation terminal 300 and the controller 100 transmit and receive information, for example, via wireless communication such as wireless local area network (LAN). Furthermore, the operation terminal 300 is, for example, a general purpose portable terminal device such as a smartphone, a tablet terminal, a notebook personal computer (PC), a head-mounted display, etc. The operation terminal 300 executes an application program (hereafter referred to as "equipment operation app") to operate the stacker crane 30.

Specifically, the operator is able to indicate a command for the operational control of the stacker crane 30 to the controller 100, by performing a predetermined input operation on the operation terminal 300 which executes the equipment operation app. Stated differently, the operator is able to operate the stacker crane 30 by remote control using the operation terminal 300.

As described above, in this preferred embodiment, a general purpose portable terminal device is used as the operation terminal 300. As such, it is difficult or substantially impossible to provide the operation terminal 300 with an emergency stop function that causes the stacker crane 30 to make an emergency stop, which satisfies a predetermined safety standard.

As such, from the point of view of ensuring safety, operational control of the stacker crane 30 according to commands from the operation terminal 300 (hereafter referred to as "equipment operation from the operation terminal 300") is, in principle, prohibited in the surroundings of the stacker crane 30. For example, a predetermined area including the stacker crane 30 and the rack 80 is surrounded by an intrusion prevention fence (described later using FIG. 5 to FIG. 7) that restricts the entrance of people, and equipment operation from the operation terminal 300 is, in principle, prohibited inside the intrusion prevention fence.

However, in the automated equipment system 10 according to this preferred embodiment, a system is created that is able to, under a predetermined condition, allow equipment operation from the operation terminal 300 at a position relatively close to the stacker crane 30.

Specifically, the controller 100 executes the operational control of the stacker crane 30 according to a command from the operation terminal 300, when wireless communication with both the operation terminal 300 and the emergency stop terminal 200 is possible.

More specifically, in this preferred embodiment, equipment operation from the operation terminal 300 is enabled when the operation terminal 300 and the emergency stop terminal 200 perform enabling communication to enable equipment operation from the operation terminal 300. Details of the enabling communication are described later using FIG. 5 to FIG. 9.

The emergency stop terminal 200 is a terminal device that performs wireless communication with the controller 100 that causes the stacker crane 30 to make an emergency stop. As illustrated in FIG. 2, in this preferred embodiment, the emergency stop terminal 200 is realized as a wearable terminal.

The emergency stop terminal 200 includes, as hardware components, a case 201, a wireless module 220 housed inside case 201, emergency stop button 210 disposed on the case 201, and wear pad 230 attached to the case 201. It should be noted that although the emergency stop terminal 200 includes other components such as a secondary battery as a power supply for operation, illustration and description of these other components will be omitted.

The emergency stop terminal 200 includes a first communicator 221 as a functional component. In this preferred embodiment, the wireless module 220 defines and functions as the first communicator 221.

The first communicator 221 performs wireless communication with the controller 100, and changes the state of the wireless communication with the controller 100 when the emergency stop button 210 is operated.

The controller 100 causes the operation of the stacker crane 30 to stop when the state of the wireless communication with the first communicator 221 is changed. In other words, when the emergency stop button 210 is operated, the stacker crane 30 is brought to an emergency stop.

In this preferred embodiment, when the emergency stop button 210 is operated, the first communicator 221 stops the wireless communication with the controller 100 to change the state of the wireless communication. When the controller 100 receives a command from the operation terminal 300 in a period in which wireless communication with the first communicator 221 is performed continuously, the controller 100 executes the operational control of the stacker crane 30 according to the command. Furthermore, the controller 100 stops the operation of the stacker crane 30 when the wireless communication with the first communicator 221 stops.

The emergency stop terminal 200 further includes a second communicator 222. The second communicator 222 performs, with the operation terminal 300, enabling communication including at least one of transmitting and receiving predetermined information, to enable the operational control of stacker crane 30 based on a command from the operation terminal 300. It should be noted that, in this preferred embodiment, the wireless module 220 defines and functions as the second communicator 222.

Here, the first communicator 221 repeatedly performs, with the controller 100, transmitting and receiving of a signal for the emergency stop of the stacker crane 30 at a predetermined interval (for example, every several milliseconds). The first communicator 221 and the controller 100 perform the transmitting and receiving of signals in parallel using two channels (communication paths) for example. The controller 100 blocks a motor circuit that operates the stacking crane 30, when the transmitting and receiving of signals in at least one of the two channels (communication paths) is interrupted.

Specifically, when the emergency stop button 210 of the emergency stop terminal 200 is operated (i.e., pressed, in this preferred embodiment), the first communicator 221 of the emergency stop terminal 200 stops the transmitting of the signal for the emergency stop to the controller 100. As a result, the stopping of the wireless communication between the controller 100 and the emergency stop terminal 200 is detected by the controller 100, and the controller 100 blocks the motor circuit that operates the stacker crane 30. With this, the stacker crane 30 makes an emergency stop.

It should be noted that it is not essential for the first communicator 221 and the controller 100 to perform the transmitting and receiving of signals in parallel using two channels (communication paths), and the first communicator 221 and the controller 100 may perform the transmitting and receiving using only one channel (communication path). Furthermore, the controller 100 may block all power supplies that causes the stacker crane 30 to operate, when the transmitting and receiving of signals in at least one channel (communication path) is interrupted.

The wear pad 230 is a component that enables the emergency stop terminal 200 to be removably worn at a position on a person's body. In this preferred embodiment, the wear pad 230 is, for example, a belt which is formed by weaving of a fabric having resin, etc., as a material, and includes a securing buckle, etc., (not illustrated in the figures).

The operator wears the emergency stop terminal 200 using the wear pad 230, at a position that is determined with ease of pressing of the emergency stop button 210, etc., in mind. For example, the emergency stop terminal 200 is worn on the wrist of the non-dominant hand of the operator in such a way that the emergency stop button 210 is facing inward.

In this manner, by including the wear pad 230, the emergency stop terminal 200 is able to be easily worn at a position that facilitates pressing of the emergency stop button 210 or a position that does not hinder maintenance work, etc. This contributes to the improvement of safety or workability of the automated equipment system 10.

Operations related to the equipment operation from the operation terminal 300 and the switching between enabling/disabling of equipment operation, executed in the automated equipment system 10 will be described using FIG. 4A to FIG. 9.

Figure 4A:
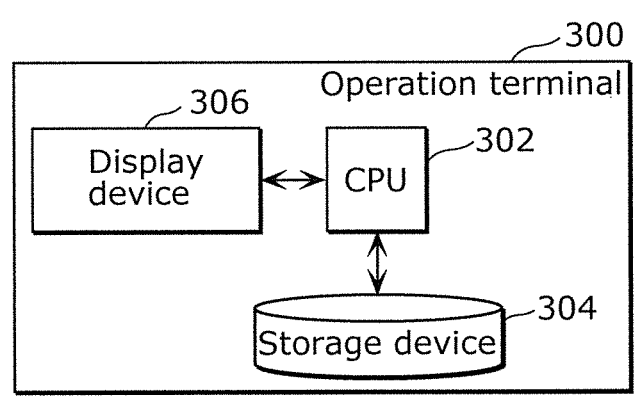
FIG. 4A is a diagram illustrating an outline configuration of an operation terminal according to a preferred embodiment of the present invention.
Figure 4B:
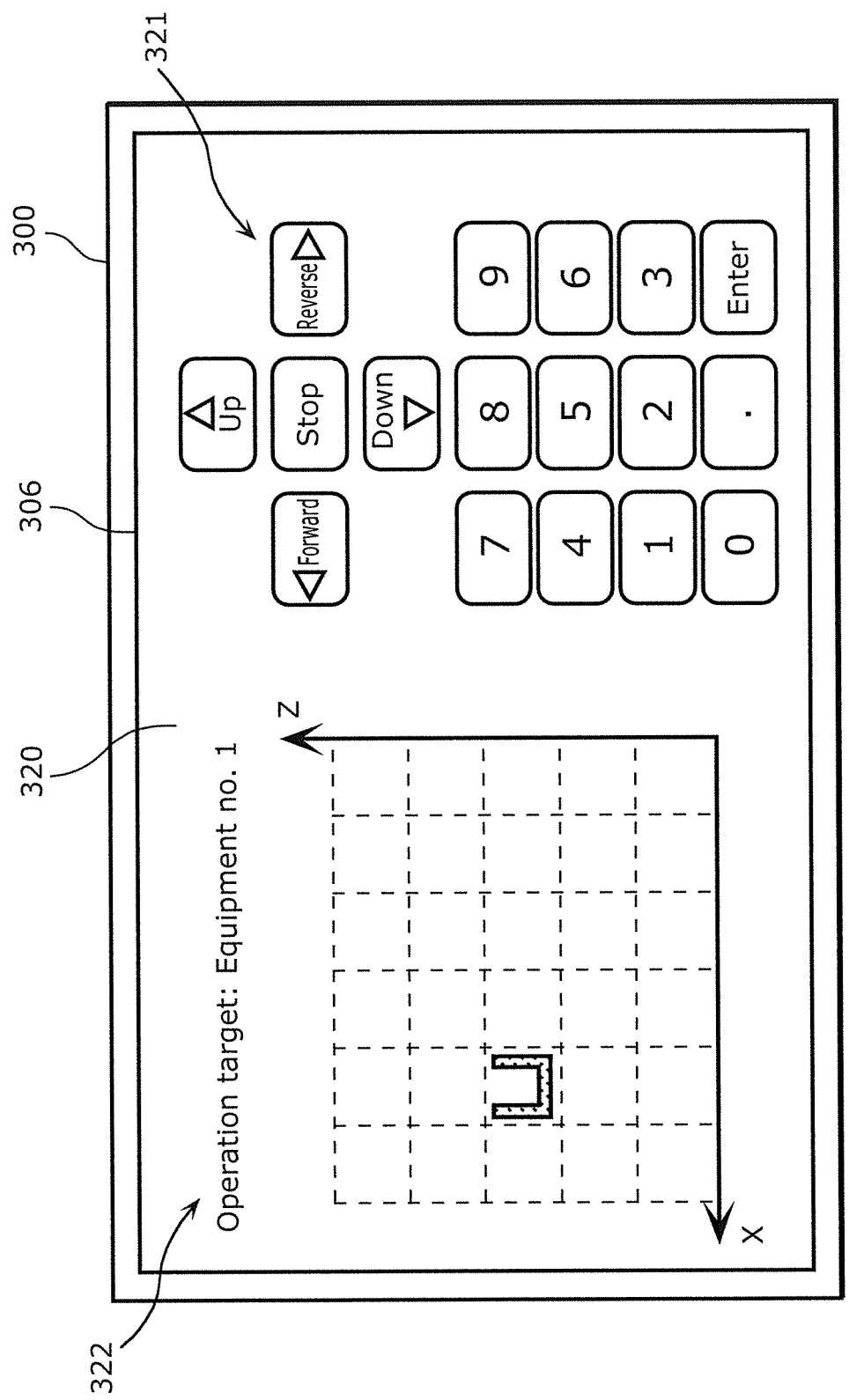
FIG. 4B is a diagram illustrating an example of a user interface screen displayed on an operation terminal according to the preferred embodiment of the present invention.

FIG. 4A is a diagram illustrating the outline configuration of the operation terminal 300 according to this preferred embodiment, and FIG. 4B is a diagram illustrating an example of a user interface screen displayed on the operation terminal 300 according to this preferred embodiment.

Figure 5:
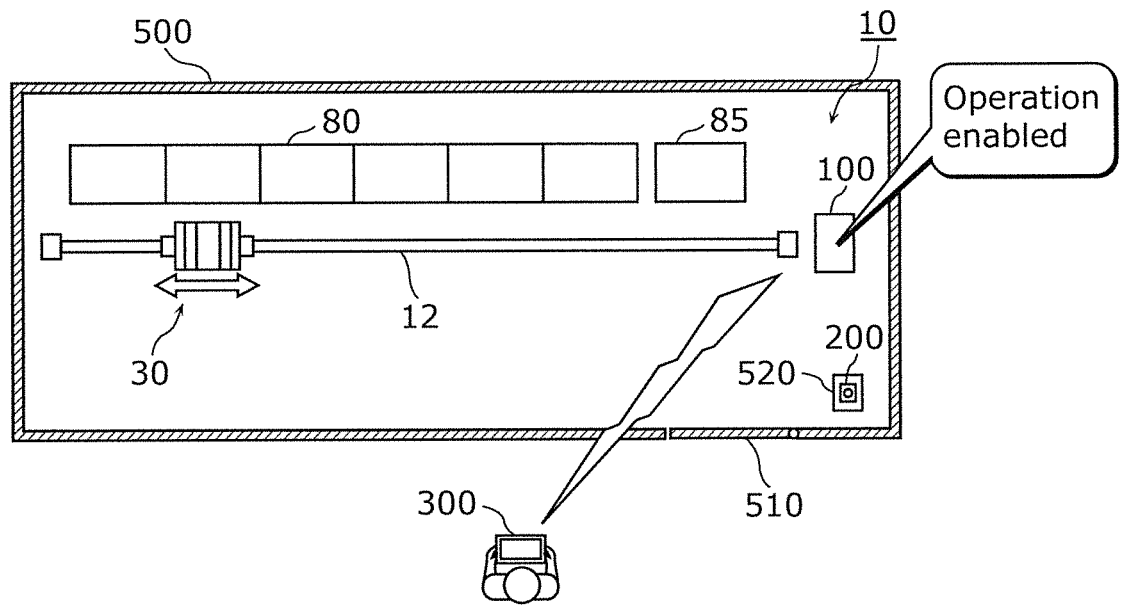
FIG. 5 is a schematic diagram illustrating a state where equipment operation from the operation terminal is being performed.
Figure 6:
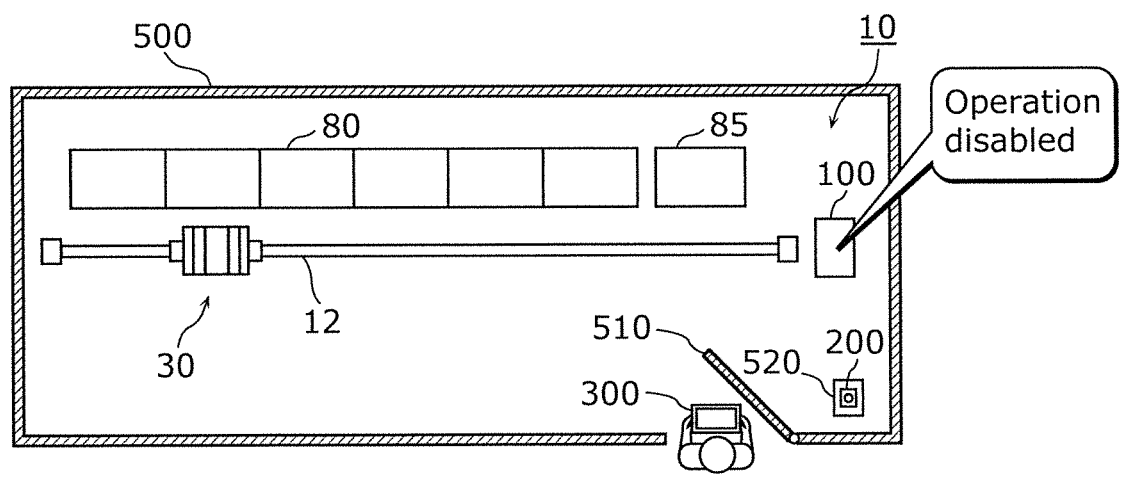
FIG. 6 is a schematic diagram illustrating a state where equipment operation from the operation terminal is disabled.
Figure 7:
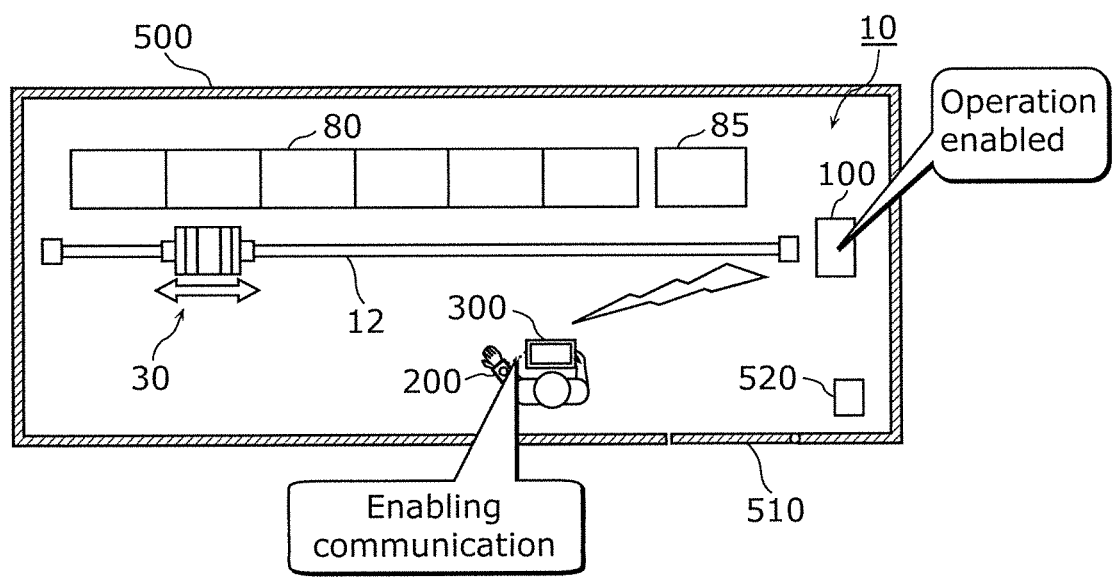
FIG. 7 is a schematic diagram illustrating a state where equipment operation from the operation terminal is enabled.

FIG. 5 is a schematic diagram illustrating the state where equipment operation from the operation terminal 300 is being performed. FIG. 6 is a schematic diagram illustrating the state where equipment operation from the operation terminal 300 is disabled. FIG. 7 is a schematic diagram illustrating the state where equipment operation from the operation terminal 300 is enabled.

As illustrated in FIG. 4A, operation terminal 300 according to this preferred embodiment includes, as hardware components, a CPU 302, a storage device 304, and a display device 306. The CPU 302 executes the equipment operation application stored in the storage device 304 to cause display device 306 to display, for example, the operation screen 320 illustrated in FIG. 4B.

For example, various operation keys 321 to provide commands to the stacker crane 30, and status information 322 indicating the status of stacker crane 30 are displayed on the operation screen 320.

The display device 306 is a device that displays information and receives input operations from the operator, by way of a touch panel for example. For example, when any of the operation keys 321 is touched (tapped) by the operator, information processing corresponding to that operation key 321 is performed by the CPU 302.

Furthermore, as illustrated in FIG. 4B, "Equipment Number 1" which is information identifying the stacker crane 30 to be operated, and the location of the lift stage 35 (see FIG. 1) of stacker crane 30 are displayed in the status information 322.

Specifically, when there are a plurality of stacker cranes 30 for which equipment operation from the operation terminal 300 is possible, a selection screen (not illustrated in the figures) is displayed after activation of the equipment operation application, and the operator is able to select one stacker crane 30 as the operation target from the plurality of stacker cranes 30, by performing a predetermined input operation. Information identifying the stacker crane 30 selected as the operation target is transmitted to the controller 100. Accordingly, the controller 100 can identify, from among the plurality of stacker cranes 30 for which operational control by the controller 100 is possible, one stacker crane 30 for which equipment operation from the operation terminal 300 is to be allowed.

The operator operates the selected stacker crane 30 by performing, on the operation screen 320 displayed on the operation terminal 300, a predetermined input operation such as tapping the operation keys 321. Furthermore, such an equipment operation from the operation terminal 300 is performed when the operator is located outside the intrusion prevention fence 500, as illustrated in FIG. 5 for example.

As illustrated in FIG. 5 to FIG. 7, in this preferred embodiment, the operation area of the stacker crane 30 and the surrounding area including the rack 80, etc., are surrounded by the intrusion prevention fence 500. The intrusion prevention fence 500 is provided with a door 510 that allows entry and exit of an operator for maintenance of the stacker crane 30, etc. In the intrusion prevention fence 500 with the above-described structure, the entry and exit of the operator is managed.

For example, the operator is able to go inside the intrusion prevention fence 500 by performing a predetermined input operation on the management device which manages the automated equipment system 10.

For example, the operator turns a key inserted in the management device disposed outside the intrusion prevention fence 500, to a position marked "maintenance" and pulls out the key. With this, the controller 100 which communicates with the management device stops the normal operational control (i.e., automatic operation of the stacker crane 30), and also disables the equipment operation from the operation terminal 300. Furthermore, the locking of the door 510 which is locked during automatic operation is released, and the operator is able to go inside the intrusion prevention fence 500.

After closing the door 510, the operator that has gone inside the intrusion prevention fence 500 inserts the key that was removed from the management device, into, for example, a cylinder electrically or mechanically connected to the controller 100 and turns the key to a position marked "manual operation". Subsequently, when wireless communication with both the operation terminal 300 and the emergency stop terminal 200 is possible, the controller 100 operates to execute equipment operation from the operation terminal 300 (that is, manual operation of the stacker crane 30).

Simply put, when the operator goes inside the intrusion prevention fence 500, equipment operation from the operation terminal 300 is disabled. Subsequently, when the controller 100 confirms the presence of the pair of the operation terminal 300 and the emergency stop terminal 200, equipment operation from the operation terminal 300 is enabled.

It should be noted that the detection of the presence or absence of a person inside the intrusion prevention fence 500 may be performed by detecting the opening and closing of the door 510 or by analyzing captured images, or may be performed through detection of a person per se. In other words, aside from a device etc. that detects or recognizes operation of the key, a sensor that detects the opening and closing of the door 510, an image sensor, a motion detector, a photoelectric sensor, etc., are examples of a detector which detects the presence or absence of a person. Furthermore, the detection of the presence or absence of a person inside the intrusion prevention fence 500 may be performed indirectly by detecting the position of the operation terminal 300. In other words, there is no particular limitation as to the method of detecting the presence or absence of a person within a predetermined area around the stacker crane 30, as long as the controller 100 is able to obtain the detection results.

In this manner, in this preferred embodiment, the operation area of the stacker crane 30 is surrounded by the intrusion prevention fence 500, and, when a person is not present inside the intrusion prevention fence 500, the controller 100 allows equipment operation from the operation terminal 300.

For example, in a period in which the stacker crane 30 is not performing a normal operation such as transporting the cargo 90, the operator located outside the intrusion prevention fence 500 activates the equipment operation application using the operation terminal 300. With this, the operator is able to execute an operation of the stacker crane (validation of the stacker crane 30 or transferring of a cargo 90 based on manually inputted information, etc.) from outside the intrusion prevention fence 500.

Furthermore, as illustrated in FIG. 6, when the operator goes inside the intrusion prevention fence 500, the controller 100 prohibits the equipment operation from the operation terminal 300. In other words, when a person is present inside a predetermined area including the automated equipment, the controller 100 does not execute operational control of the automated equipment according to a command from the operation terminal 300.

For example, even when the controller 100 receives a command from the operation terminal 300, the controller 100 ignores the command. It should be noted that there is no particular limitation the method used to disable the equipment operation from the operation terminal 300. For example, the equipment operation application executed by the operation terminal 300 and the controller 100 may communicate with each other, and the equipment operation application, under control from the controller 100, may stop all processing.

It should be noted that FIG. 6 illustrates the operator carrying the operation terminal 300 going inside the intrusion prevention fence 500 from the door 510. However, in principle, the key operation in the management device is performed when a person goes inside the intrusion prevention fence 500 regardless of whether or not the operation terminal 300 is carried, and thus, as a result, equipment operation from the operation terminal 300 is prohibited.

Here, when the equipment operation from the operation terminal 300 is prohibited, conventionally, the operator, for example, needs to switch from the operation terminal 300 to an emergency stop button-equipped remote control connected by wire to controller 100, to perform input operations for the maintenance, etc., of the stacker crane 30. In this case, for example, there are instances where the communication cable connecting the remote control and the controller 100 may hinder the maintenance work, etc. For example, the efficiency of the maintenance work, etc., may deteriorate due to differences in input operation procedures between the controller 300 and the remote control.

However, as illustrated in FIG. 7, in the automated equipment system 10 according to this preferred embodiment, the operation terminal 300 and the emergency stop terminal 200 perform enabling communication to enable the equipment operation from the operation terminal 300. In other words, even when a person is present inside the predetermined area including the automated equipment, the controller 100 executes operational control of the automated equipment according to a command transmitted from the operating device 300 via wireless communication.

With this, the operator is able to operate the stacker crane 30 using the operation terminal 300 that performs wireless communication with the controller 100, in an environment which allows emergency stopping of the stacker crane 30 according to the will of the operator.

It should be noted that, in this preferred embodiment, the emergency stop terminal 200 is normally placed on a charging stand 520, and charging of the secondary battery provided inside the emergency stop terminal 200 is performed using, for example, a noncontact technique.

Operations related to the enabling of the equipment operation from the operation terminal 300 performed in the automated equipment system 10 will be described using the communication sequence diagrams in FIG. 8 and FIG. 9.

Figure 8:
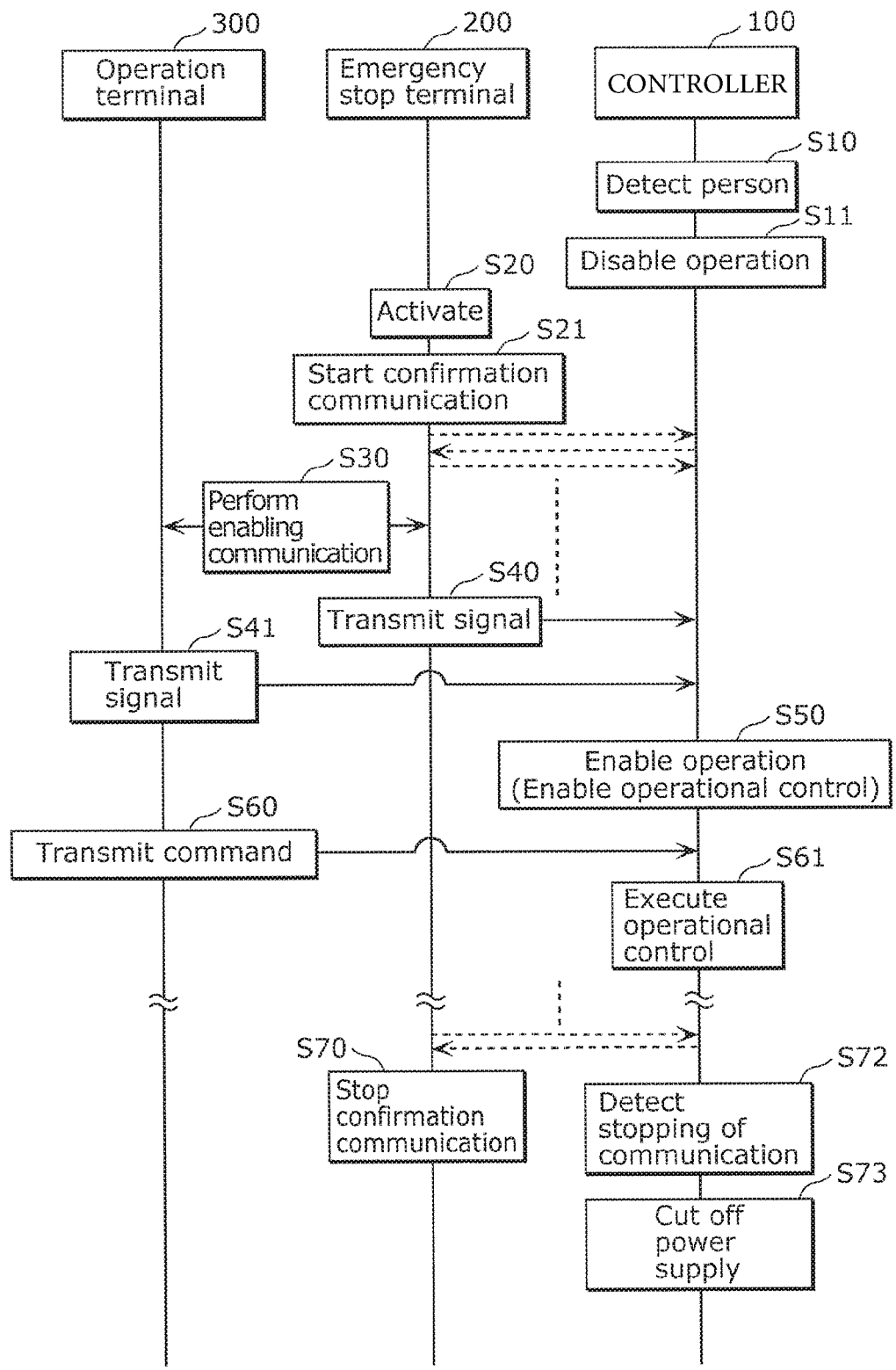
FIG. 8 is a sequence chart illustrating an example of a communication sequence in an automated equipment system according to a preferred embodiment of the present invention.

FIG. 8 is a sequence chart illustrating an example of a communication sequence in the automated equipment system according to this preferred embodiment. FIG. 9 is a sequence chart illustrating a detailed example of enabling communication and the resulting enabling of equipment operation, according to the present preferred embodiment.

As illustrated in FIG. 8, the controller 100 detects a person deemed to be present inside the intrusion prevention fence 500 when, for example, the key operation in the management device is performed as described above (S10). With this, the controller 100 disables equipment operation according to a command from the operation terminal 300 (S11).

As a result, for example, even when a command for operational control of the stacker crane 30 is transmitted from the operation terminal 300 to the controller 100, the command is ignored by the controller 100.

Subsequently, when the operator that has gone inside the intrusion prevention fence 500 picks up the emergency stop terminal 200 from the charging stand 520, the emergency stop terminal 200 is activated (S20). In other words, structural components such as the wireless module 220 (first communicator 221, second communicator 222) are placed in an operational state.

It should be noted that there is no particular limitation as to the trigger for the activation of the emergency stop terminal 200. For example, the emergency stop terminal 200 may be activated by operating a mechanical switch provided in the emergency stop terminal 200.

After being activated, the emergency stop terminal 200 starts performing, with the controller 100, confirmation communication, which is the transmitting and receiving of signals for the emergency stop of the stacker crane 30 (S21). For example, the first communicator 221 of the emergency stop terminal 200 transmits a signal (referred to as a "beacon" for example) informing others of its presence, and the controller 100 that receives the signal transmits, to the emergency stop terminal 200, a signal indicating a reply to the signal. By continuing the confirmation communication, which is the exchange of such signals, the presence of one of the controller 100 and the emergency stop terminal 200 is confirmed by the other. It should be noted that the reliability of the emergency stop of the stacker crane 30 is able to be improved by executing the confirmation communication in parallel using two channels (communication paths) (i.e., duplication of confirmation communication) as described above. The confirmation communication started in the manner described above is continued until the pressing of the emergency stop button 210 to be described later.

Subsequently, for example, when the operator performs a predetermined input operation, such as activating the equipment operation application, on the operation terminal 300, enabling communication is performed between the operation terminal 300 and the emergency stop terminal 200 (S30).

Enabling communication is communication that is carried out between the second communicator 222 of the emergency stop terminal 200 and the operation terminal 300, and includes at least one of transmitting and receiving predetermined information, to enable operational control of the stacker crane 30 (i.e., equipment operation by the operation terminal 300).

In other words, enabling communication is an example of communication, the establishment of which, serves as proof that the pair of the operation terminal 300 and the emergency stop terminal 200 are in the active state. As a result of the performance of enabling communication, the controller 100 operates to enable equipment operation from the operation terminal 300.

Here, in this preferred embodiment, the second communicator 222 of the emergency stop terminal 200 and the operation terminal 300 perform the transmitting and receiving of predetermined information using close-proximity wireless communication. For example, Bluetooth (registered trademark) or infrared communication can be used as such close-proximity wireless communication.

In other words, when the enabling communication between the operation terminal 300 and the emergency stop terminal 200 is performed by close-proximity wireless communication, it can be deemed that the emergency stop terminal 200 is located within a range that allows operation by the operator operating the operation terminal 300. Therefore, even when equipment operation from the operation terminal 300, which does not have an emergency stop function, is enabled, a certain level of safety is ensured.

In the above-described enabling communication, the operation terminal 300 and the emergency stop terminal 200, for example, execute an exchange of information to identify a connection partner (referred to as "pairing", for example).

After completion of such an enabling communication, a signal containing predetermined information is transmitted to the controller 100 from each of the operation terminal 300 and the emergency stop terminal 200 (S40, S41).

With the receiving of such signals as a condition, the controller 100 executes the enabling of equipment operation from the operation terminal 300 that was temporarily disabled in step S11 (S50). As a result, when a command for operational control of the stacker crane 30 is transmitted from the operation terminal 300 (S60), the controller 100 receives and properly processes the command. With this, operational control of the stacker crane 30 according to the command is executed (S61).

Specifically, when the controller 100 receives a command from the operation terminal 300 in the period in which the confirmation communication started in step S21 is performed continuously, the controller 100 executes operational control of the stacker crane 30 according to the command.

It should be noted that, from the signal of at least one of the operation terminal 300 and the emergency stop terminal 200 that is transmitted in step S40 or step S41, the controller 100 is able to identify the operation terminal 300 that is the source of the command for the operational control of the stacker crane 30 that the controller 100 should receive. In other words, the controller 100 is able to perform authentication of the operation terminal 300.

Furthermore, when operational control of a plurality of stacker cranes 30 is possible, the controller 100 receives, from the identified operation terminal 300, information indicating the operation target stacker crane 30 (see FIG. 4B), which is transmitted together with the command for equipment control in step S60 for example. With this, the one stacker crane 30 (control target equipment) on which operational control according to the command should be executed is able to be identified.

Specifically, when the sender of the command for operational control of the stacker crane 30 is the identified (authenticated) operation terminal 300, the controller 100 is able to, upon receiving the command, execute operational control of the control target equipment according to the command.

Subsequently, when the emergency stop button 210 of the emergency stop terminal 200 is pressed, the first communicator 221 stops the confirmation communication (S70). Specifically, the first communicator 221 stops the transmission of the signal informing others of its presence, which was started in step S21.

The controller 100 detects the stoppage of the confirmation communication when the controller 100 does not receive the signal from the emergency stop terminal 200 (S72). More specifically, when the controller 100 does not receive the signal from the emergency stop terminal 200 in at least one of the channels (communication paths) on which the confirmation communication is performed, the controller 100 detects the stoppage of the confirmation communication.

When the controller 100 detects the stoppage of the confirmation communication, the controller 100 blocks the motor circuit that operates the stacking crane 30. With this, the power supply for the operation of the stacker crane 30 is cut off (S73). As a result, the stacker crane 30 makes an emergency stop. In this manner, in this preferred embodiment, the controller 100 blocks the motor circuit of the stacker crane 30 when the controller 100 detects the stoppage of the confirmation communication. Stated differently, in the period in which the confirmation communication is being continued, the controller 100 operates in such a way that the power supply for the operation of the stacker crane 30 is maintained.

It should be noted that, when operational control of a plurality of stacker cranes 30 is possible, the controller 100 blocks the motor circuit that operates the one stacker crane 30 identified as the control target equipment as described above.

More specific examples of the enabling communication (S30) and the enabling of equipment operation from the operation terminal 300 (S50) in the flow of communication and operations in the automated equipment system 10 will be described using FIG. 9.

Figure 9:
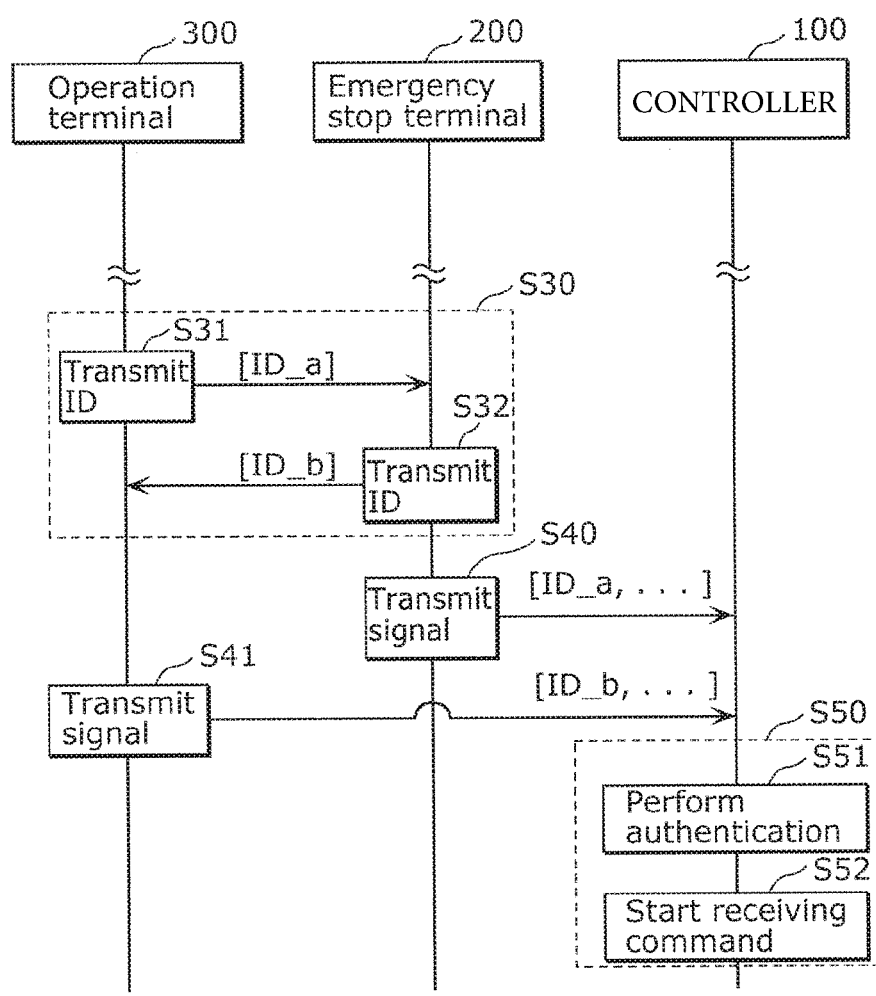
FIG. 9 is a sequence chart illustrating a detailed example of enabling communication and the resulting enabling of equipment operation, according to a preferred embodiment of the present invention.

As illustrated in FIG. 9, in the enabling communication (S30), the operation terminal 300 transmits, to the emergency stop terminal 200, first identification information (for example, "ID_a") which is identification information of the operation terminal 300 (S31).

In the enabling communication (S30), the second communicator 222 of the emergency stop terminal 200 transmits, to the operation terminal 300, second identification information (for example, "ID_b") which is identification information of the emergency stop terminal 200 (S32).

It should be noted that, although omitted in FIG. 9, the operation terminal 300 and the emergency stop terminal 200 perform the enabling communication according to a predetermined rule, such as replying with a response when identification information of the other party is received.

Subsequently, the emergency stop terminal 200 transmits, to the controller 100, a signal containing "ID_a" which is the identification information of the operation terminal 300 (S40). The operation terminal 300 transmits, to the controller 100, a signal including "ID_b" which is the identification information of the emergency stop terminal 200 (S41). It should be noted that either step S40 or step S41 can be executed first.

The controller 100 executes the enabling of equipment operation from the operation terminal 300, based on the respective signals transmitted in step S40 and step S41 (S50).

Specifically, controller 100 authenticates the operation terminal 300 based on the respective signals transmitted in step S40 and step S41 (S51). When the authentication is successful, the controller 100 starts the receiving of commands transmitted from the authenticated operation terminal 300 (S52). In other words, equipment operation from the operation terminal 300 is enabled.

It should be noted that there is no particular limitation as to the method for the authentication. For example, in step S40, the emergency stop terminal 200 may transmit, to the controller 100, a signal containing "ID_b" which is its own identification information and "ID_a" which is the identification information of the other party which is the operation terminal 300. Furthermore, in step S41, the operation terminal 300 may transport, to the controller 100, a signal containing "ID_a" which is its own identification information and "ID_b" with is the identification information of the other party which is the emergency stop terminal 200.

Controller 100 is able to authenticate that the operation terminal 300 having the identification information "ID_a", when the two signals received from the operation terminal 300 and the emergency stop terminal 200 both contain the pair of "ID_a" and "ID_b".

It should be noted that, after the enabling communication (S30), the controller 100 may execute the operational control of the stacker crane 30 according to a command from the operation terminal 300, with the receipt of the signal to be transmitted from either the operation terminal 300 or the emergency stop terminal 200 as at least one condition. In other words, it is not essential that both the operation terminal 300 and the emergency stop terminal 200 transmit, to the controller 100, a signal containing predetermined information such as its own or the other party's identification information, after the enabling communication. Furthermore, the predetermined information contained in the signal to be transmitted to the controller 100 after the enabling communication need not be the identification information of the operation terminal 300 or the emergency stop terminal 200.

For example, the first communicator 221 of the emergency stop terminal 200 transmits a signal containing information regarding the operation terminal 300, which is the predetermined information, to the controller 100, after the second communicator 222 performs the enabling communication. In this case, the controller 100 may execute the operational control of the stacker crane 30 according to a command from the operation terminal 300, with the receipt of the signal containing information regarding the operation terminal 300 which is to be transmitted from the emergency stop terminal 200 being at least one condition.

It should be noted that, aside from the aforementioned first identification information, information indicating that the operation terminal 300 is a terminal stored in advance in the emergency stop terminal 200 (information indicating that the operation terminal 300 was authenticated by the emergency stop terminal 200) and identification information of the operator operating the operation terminal 300, etc., are examples of information regarding the operation terminal 300.

In this case, the controller 100 is able to obtain the information regarding the operation terminal 300, via the emergency stop terminal 200. Furthermore, emergency stop terminal 200 continuously performs, with the controller 100, the confirmation communication it started after being activated (see step S21 in FIG. 8). As such, the controller 100, for example, is able to accurately recognize the presence of the pair of the operation terminal 300 and the emergency stop terminal 200. In other words, the controller 100 is able to perform the authentication of the operation terminal 300, based only on the information transmitted from the emergency stop terminal 200.

Furthermore, the controller 100 may execute the operational control of the stacker crane 30 according to a command from the operation terminal 300, with the receipt of a signal including the information regarding the emergency stop terminal 200 which is to be transmitted from the operation terminal 300 being at least one condition.

It should be noted that, aside from the aforementioned second identification information, information indicating that the emergency stop terminal 200 is a terminal stored in advance in the operation terminal 300 (information indicating that the emergency stop terminal 200 was authenticated by the operation terminal 300) and identification information of the operator operating the emergency stop terminal 200, etc., are examples of information regarding the emergency stop terminal 200.

In this case, the controller 100 is able to obtain the information regarding the emergency stop terminal 200, via the operation terminal 300. As such, the controller 100, for example, is able to accurately recognize the presence of the pair of the operation terminal 300 and the emergency stop terminal 200. In other words, the controller 100 is able to recognize that the operation terminal 300 is a terminal that is used in combination with an emergency stop terminal 200 having the appropriate emergency stop function. In other words, the controller 100 is able to perform the authentication of the operation terminal 300, based only on the information transmitted from the operation terminal 300.

It should be noted that in the automated equipment system 10 in which the above-described operations are performed, operations performed by the operation terminal 300 such as the enabling communication, etc., are preferably implemented by way of operation terminal 300 executing a predetermined program, for example. The predetermined program is a program that causes a computer (CPU 302, etc.) included in the operation terminal 300 to execute at one or more of the steps included in, for example, a control method of the operation terminal 300 described below.

The control method of the operation terminal 300 includes performing enabling communication including at least one of transmitting and receiving predetermined information, to enable operational control of the stacker crane 30, with the emergency stop terminal 200 which performs wireless communication with the stacker crane 30 and is capable of causing the stacker crane to make an emergency stop.

Furthermore, in this preferred embodiment, the control method of the operation terminal 300 further includes, after performing the enabling communication, transmitting a signal including information regarding the emergency stop terminal 200 which is the predetermined information, to the controller 100.

Furthermore, in this preferred embodiment, the performing of enabling communication includes receiving identification information of the emergency stop terminal 200 which is the predetermined information, and in the transmitting of the signal, a signal including the identification information, which is information regarding the emergency stop terminal 200 which is received in the receiving of the identification information, is transmitted to the controller 100.

It should be noted that, for example, the program is stored in the storage device 304 of the operation terminal 300, and is read out and executed by the CPU 302. Furthermore, the program may be stored in the storage device 304 as a portion of the equipment operation application executed by the operation terminal 300.

As described above, in the automated equipment system 10 according to this preferred embodiment, the controller 100 executes the operational control of the stacker crane 30 according to a command from the operation terminal 300, when wireless communication with both the operation terminal 300 and the emergency stop terminal 200 is possible. In other words, even when the controller 100 operates to enable equipment operation by wireless communication using the operation terminal 300, the operator is able to cause the automated equipment to make an emergency stop by using the emergency stop terminal 200, and thus a certain level of safety is ensured.

Furthermore, since both the operation terminal 300 and the emergency stop terminal 200 perform wireless communication with the controller 100, the automated equipment maintenance work, etc. performed by the operator is not hindered by a communication cable, for example.

Furthermore, since the operation terminal 300 and the emergency stop terminal 200 are used in combination, a general purpose portable terminal device such as a smartphone or a tablet terminal for which providing the emergency stop function is substantially impossible is able to be used as the operation terminal 300. As such, for example, a portable terminal device that is suited to the country or area or use environment (i.e., high/low temperature or humidity, indoor/outdoor use, etc.) of the automated equipment system 10 is able to be selected as the operation terminal 300.

Therefore, the automated equipment system 10 according to this preferred embodiment is an automated equipment system 10 that is safe and has excellent workability.

Furthermore, in this preferred embodiment, the controller 100, in principle, prohibits equipment operation from the operation terminal 300 when a person is detected in a predetermined area surrounding the stacker crane 30. Subsequently, the operation terminal 300 and the emergency stop terminal 200 perform enabling communication including at least one of transmitting and receiving predetermined information to thereby enable the equipment operation from the operation terminal 300.

Specifically, the controller 100 executes operational control of the stacker crane 30 according to a command from the operation terminal 300 when the controller 100 receives a signal to be transmitted from at least one of the operation terminal 300 and the emergency stop terminal 200.

Here, the case where the controller 100 establishes wireless communication with the operation terminal 300, for example, is assumed. In this case, when a signal transmitted from the emergency stop terminal 200 is received by the controller 100, it is possible to confirm that both the operation terminal 300 and the emergency stop terminal 200 are in a state where wireless communication with the controller 100 is possible. As a result, the controller 100 operates to enable the execution of equipment operation from the operation terminal 300.

Furthermore, in the enabling communication, for example, one of the operation terminal 300 and the emergency stop terminal 200 receives identification information transmitted from the other, and transmits that received identification information to the controller 100. As a result, the controller 100 is able to, for example, confirm that the pair of the operation terminal 300 and the emergency stop terminal 200 are appropriate (i.e., can verify the pair).

An automated equipment system according to the present preferred embodiment has been described thus far based on preferred embodiments. However, the present invention is not limited to the above-described preferred embodiments. Various modifications to the preferred embodiments, etc., that may be conceived by a person of ordinary skill in the art or those forms obtained by combining the above-described constituent elements, for as long as they do not depart from the essence of the present invention, are intended to be included in the scope of the present invention.

For example, in the foregoing preferred embodiments, when a person goes inside the intrusion prevention fence 500 provided to surround a predetermined area including the stacker crane 30, equipment operation from the operation terminal 300 that was in an enabled state is temporarily prohibited (disabled), after which the equipment operation is enabled. However, the intrusion prevention fence 500 is not an essential structural component of the automated equipment system 10. Furthermore, temporarily prohibiting the equipment operation from the operation terminal 300 according to some kind of condition is not essential to the automated equipment system 10.

For example, the controller 100 may operate to execute the equipment operation from the operation terminal 300 as long as the condition that the pair of the operation terminal 300 and the emergency stop terminal 200 are active (i.e., the pair can perform wireless communication with the controller 100) is satisfied.

In other words, regardless of whether the operator is at a position near the stacker crane 30, the controller 100 may operate to execute equipment operation from the operation terminal 300 under the condition that wireless communication with both the operation terminal 300 and the emergency stop terminal 200 is possible. Accordingly, during manual operation of the stacker crane 30 using the operation terminal 300, the operator is able to execute an emergency stop of the stacker crane by remote control using the emergency stop terminal 200, independently of the location of the operator. As a result the safety of the automated equipment system 10 further improves.

Furthermore, the enabling communication between the operation terminal 300 and the emergency stop terminal 200 is not essential as a condition for the controller 100 to execute equipment operation from the operation terminal 300. For example, the controller 100 may also confirm that the pair of the operation terminal 300 and the emergency stop terminal 200 are active, according to a signal that each one of the operation terminal 300 and emergency stop terminal 200 transmits independently of the operation of the other. In other words, each of the operation terminal 300 and the emergency stop terminal 200 may, without communicating with the other, inform the controller 100 that wireless communication with the controller 100 is possible.

Furthermore, although the controller 100 causes the stacker crane 30 to make an emergency stop when confirmation communication with the emergency stop terminal 200 stops, the trigger for the emergency stop of the stacker crane 30 need not be the stopping of the confirmation communication. The controller 100 may cause the stacker crane 30 to make an emergency stop when the controller 100 for example receives a predetermined signal from the emergency stop terminal 200. In other words, when the emergency stop button 210 is operated, the first communicator 221 of the emergency stop terminal 200 may start wireless communication with the controller 100 to change the state of the wireless communication.

Furthermore, for example, the operation terminal 300 and the emergency stop terminal 200 may perform enabling communication via a communication cable. For example, the operation terminal 300 and the emergency stop terminal 200 may be connected by wire by inserting a plug at the end of a communication cable provided extending from the emergency stop terminal 200 into the operation terminal 300.

In this case, the length of the communication cable is restricted to within several tens of centimeters, for example. Accordingly, when enabling communication is performed, it can be deemed that the emergency stop terminal 200 is located within a range that allows operation by the operator operating the operation terminal 300. Therefore, even when equipment operation from the operation terminal 300, which does not have an emergency stop function, is enabled, a certain level of safety is ensured.

Furthermore, the emergency stop terminal 200 may include an interface (physical keys, a touch panel, etc.) for input and output of information. In this case, for example, mutual authentication of the operation terminal 300 and the emergency stop terminal 200 may be performed inputting a code generated and displayed by one of the operation terminal 300 and the emergency stop terminal 200 into the other.

Furthermore, there is no limitation on the method of inputting information to the operation terminal 300 and the emergency stop terminal 200. For example the action of the operator may be identified by image analysis, and information corresponding to the identified action may be inputted to the operation terminal 300 or the emergency stop terminal 200. Furthermore, information identified based on a sound uttered by the operator, the movement of an eye or a change in the brainwaves of the operator, etc., may be inputted to the operation terminal 300 or the emergency stop terminal 200. Specifically, a gesture or a change in the brainwaves of the operator may be detected and operational control of automated equipment such as the stacker crane 30 may be executed based on the detection result.

Furthermore, the type of the wear pad 230 of the emergency stop terminal 200 need not be a band. The wear pad 230 may be, for example, a neck strap used to position the emergency stop terminal 200 on the chest of the operator. Furthermore, the wear pad 230 may be, for example, an engaging component that detachably engages with a component secured to the operator or may be a metal magnet that connects, by magnetic force, with a component secured to the operator.

Furthermore, in emergency stop terminal 200, the functions of the first communicator 221 and the second communicator 222 are preferably implemented by the wireless module 220, for example. However, the function of each of the first communicator 221 and the second communicator 222 may be implemented by two physically separate wireless modules, for example.

Furthermore, as illustrated in FIG. 4B, the operation screen 320 is an example of a user interface displayed on the operation terminal 300, and the status information 322 need not be displayed on the operation screen 320.

Furthermore, the type of the automated equipment included in the automated equipment system 10 is not limited to the stacker crane 30. For example, equipment used in a logistics system such as an unmanned transport cart that transports cargo according to commands from a master computer, or a sorting apparatus that automatically sorts cargo according to commands from a master computer may be used as the automated equipment included in the automated equipment system 10.

Furthermore, for example, a machine tool that performs cutting, etc., of metal material under computer control may be used as the automated equipment included in the automated equipment system 10. Furthermore, for example, an automatic loom that weaves thread to create fabric under computer control or an amusement ride that executes a predetermined operation under computer control may be used as the automated equipment included in the automated equipment system 10.

In any of the above cases, the controller 100 operates to execute equipment operation from the operation terminal 300 when both the operation terminal 300 and the emergency stop terminal 200 are capable of performing wireless communication with the controller 100, and excellent workability during maintenance, etc., and ensuring of safety are both achieved.

The automated equipment systems according to preferred embodiments of the present invention preferably are automated equipment systems that are safe and have excellent workability. As such, the automated equipment systems according to preferred embodiments of the present invention are useful as automated equipment systems including a transport cart (a stacker crane or an unmanned transport cart, or the like), and automated equipment systems including industrial equipment such as a machine tool or automatic looms, etc.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automated equipment system including automated equipment, the automated equipment system comprising:
    an emergency stop terminal that causes the automated equipment to make an emergency stop; and
    a controller that executes operational control of the automated equipment;
    wherein the emergency stop terminal includes:
      an emergency stop button; and
      a first communicator that performs wireless communication with the controller, and changes a state of the wireless communication with the controller when the emergency stop button is operated;
    the controller is configured or programmed to:
      (a) execute the operational control of the automated equipment according to a command from an operation terminal when wirelessly communicating with both the operation terminal and the emergency stop terminal, the operation terminal being a terminal that transmits a command for the operational control of the automated equipment; and
      (b) stop operation of the automated equipment when the state of the wireless communication with the first communicator is changed; and
    the controller is configured or programmed to:
      execute the operational control of the automated equipment according to the command from the operation terminal when the controller receives the command from the operation terminal in a period in which the wireless communication with the first communicator is being continuously performed; and stop the operation of the automated equipment when the wireless communication with the first communicator stops.

2. The automated equipment system according to claim 1, wherein
    the emergency stop terminal further includes a second communicator that performs, with the operation terminal, enabling communication including at least one of transmitting and receiving predetermined information, to enable the operational control of the automated equipment; and the controller is configured or programmed to execute the operational control of the automated equipment according to the command from the operation terminal, when the controller receives a signal transmitted by at least one of the operation terminal and the emergency stop terminal after the enabling communication is performed.

3. The automated equipment system according to claim 2, wherein the first communicator transmits, to the controller, a signal including information regarding the operation terminal which is the predetermined information, after the second communicator performs the enabling communication with the operation terminal; and the controller executes the operational control of the automated equipment according to the command from the operation terminal, under at least one condition that the controller receives the signal including the information regarding the operation terminal transmitted from the emergency stop terminal.

4. The automated equipment system according to claim 3, wherein in the enabling communication, the second communicator receives, from the operation terminal, first identification information which is identification information of the operation terminal and is the predetermined information; and the first communicator transmits, to the controller, a signal including the first identification information which is the information regarding the operation terminal.

5. The automated equipment system according to claim 2, wherein the controller is configured or programmed to execute the operational control of the automated equipment according to the command from the operation terminal, under at least one condition that the controller receives a signal including information regarding the emergency stop terminal transmitted from the operation terminal.

6. The automated equipment system according to claim 5, wherein in the enabling communication, the second communicator transmits, to the operation terminal, second identification information which is identification information of the emergency step terminal; and the controller is configured or programmed to execute the operational control of the automated equipment according to the command from the operation terminal, under at least one condition that the controller receives a signal including the second identification information which is the information regarding the emergency stop terminal transmitted from the operation terminal.

7. The automated equipment system according to claim 1, wherein the emergency stop terminal further includes a wear pad that enables removably wearing of the emergency stop terminal at a position on a human body.

* * * * *